United States Patent

[11] 3,571,727

[72] Inventor John A. Lombardi
Bradford, Mass.
[21] Appl. No. 783,348
[22] Filed Dec. 12, 1968
[45] Patented Mar. 23, 1971
[73] Assignee Bell Telephone Laboratories, Incorporated
Murray Hill, N.J.

[54] ASYNCHRONOUS SEQUENTIAL DIVIDE BY THREE LOGIC CIRCUIT
9 Claims, 8 Drawing Figs.

[52] U.S. Cl. .......... 328/41, 307/215, 307/218, 307/225
[51] Int. Cl. .......... H03k 21/00
[50] Field of Search .......... 307/208, 215, 218, 225, 262, 269, 271; 328/41, 37, (Subs)

[56] References Cited
UNITED STATES PATENTS

| | | | |
|---|---|---|---|
| 3,110,821 | 11/1963 | Webb .......... | 307/215 |
| 3,381,117 | 4/1968 | Forslund et al. .......... | 307/215X |
| 3,458,825 | 7/1969 | Lagemann .......... | 307/208X |
| 3,467,839 | 9/1969 | Miller .......... | 307/215X |
| 3,374,339 | 3/1968 | Webb .......... | 328/41X |

*Primary Examiner*—John S. Heyman
*Attorneys*—R. J. Guenther and E. W. Adams, Jr.

ABSTRACT: The particular state assignments used result in a two-level realization that can be economically implemented with integrated logic gates. With successive level changes of the input clock signal the circuit produces a succession of states of the internal state variable which are fed back to control, along with the clock, these internal variables. Each variable has a period three times the period of the clock and may be monitored as the output but the duty cycle and phase of each differ.

INVENTOR
J. A. LOMBARDI
BY Roy M. Porter Jr.
ATTORNEY

| $y_1$ | $y_2$ | $y_3$ | C = 0 | C = 1 |
|---|---|---|---|---|
| 0 | 1 | 0 | 0 1 0 | 0 0 0 |
| 0 | 0 | 0 | 0 0 1 | 0 0 0 |
| 0 | 0 | 1 | 0 0 1 | 1 0 1 |
| 1 | 0 | 1 | 1 0 0 | 1 0 1 |
| 1 | 0 | 0 | 1 0 0 | 1 1 0 |
| 1 | 1 | 0 | 0 1 0 | 1 1 0 |

$Y_1, Y_2, Y_3$ $Y_2 = \bar{C}y_2 + y_1 y_2 \bar{y}_3 + Cy_1\bar{y}_3$ $Y_3 = \bar{C}\bar{y}_1\bar{y}_2 + Cy_3 + \bar{y}_1\bar{y}_2 y_3$

ASYNCHRONOUS SEQUENTIAL DIVIDE BY THREE LOGIC CIRCUIT

BACKGROUND OF THE INVENTION

This invention relates to circuits for generating an output pulse train having a pulse repetition frequency which is an integral submultiple of the pulse repetition frequency of the driving pulse train. More particularly, this invention relates to divide-by-three circuits utilizing high-speed logic circuitry.

The basic building block of any conventional divider is a bistable element such as a toggle flip-flop. These dividers, commonly ripple and parallel-clocked counters, are therefore inherently binary in nature and division by an integer, not a power of two, usually requires division by a larger integer which is a power of two, and a feedback mechanism to eliminate the unwanted states. High-speed dividers of this type are limited by the delay inherent in each bistable element and the additional delay introduced by the feedback path.

In digital information-processing systems and digital transmission systems, such as pulse code modulation, counters or frequency dividers are sometimes desired which operate at very high clock rates. The delays encountered in conventional binary devices are usually the limiting factor. Where division by an integer not a power of two is needed the required feedback results in additional speed-limiting processes. High-speed logic circuitry can be used to provide fast divide by two circuits, but these do not generally provide the optimum arrangement for division by nonpowers of two since such dividers result in a reduction of maximum operating frequency because of the required feedback. For instance, a potential 16 state circuit made up of four toggle flip-flops may be transformed to a nine state circuit by the application of feedback. The price one must pay for this type of transformation is an increase in the number of gates and a lowering of the maximum operating frequency due to the increase in delay caused by the gates in the feedback loop or loops.

It is the object of the present invention to provide a high-speed divider which divides directly by a nonpower of two by eliminating the penalty associated with bistable elements which inherently divide by two (or a multiple of two).

SUMMARY OF THE INVENTION

In accordance with the invention, an all-gate divider which divides directly by three is created. The circuit is an asynchronous sequential circuit and because of unique state assignments made, the maximum operating frequency or input pulse repetition frequency which the circuit can divide is essentially limited by only two gates in series. By employing an explicit pattern of feedback paths, the existing states of the circuit's internal state variables control along with the input clock, the production of the succeeding states of the internal variables. The multiple feedback paths assure that a stable condition is realized within two gate delays after a change of state of the clock. Furthermore, the configuration prevents more than one of the variables from changing state between one stable condition and the next.

Unwanted higher states are removed by design and thus no cancellation of them is required, and all possible malfunctions due to existing hazards and races commonly present in asynchronous sequential circuits have been removed. Fewer gates are used than would be required if two toggle flip-flops made of gates were used with feedback to eliminate the fourth unwanted state, as is shown in FIG. 1.

BRIEF DESCRIPTION OF THE DRAWING

This invention will be more fully comprehended from the following detailed description taken in conjunction with the drawing in which.

DETAILED DESCRIPTION

Conventional divide by three logic circuits are of the binary type and utilize two bistable elements to count to four and appropriate feedback to inhibit the fourth unwanted state. The bistable elements may be conventional circuits such as JK flip-flops, master-slave flip-flops, or toggle flip-flops, but in any event feedback is needed to reduce the division to the integer three. For higher nonpower of two integers such as nine, a division by a higher binary number such as 16 is required with appropriate feedback to reduce the count.

Figure 1:
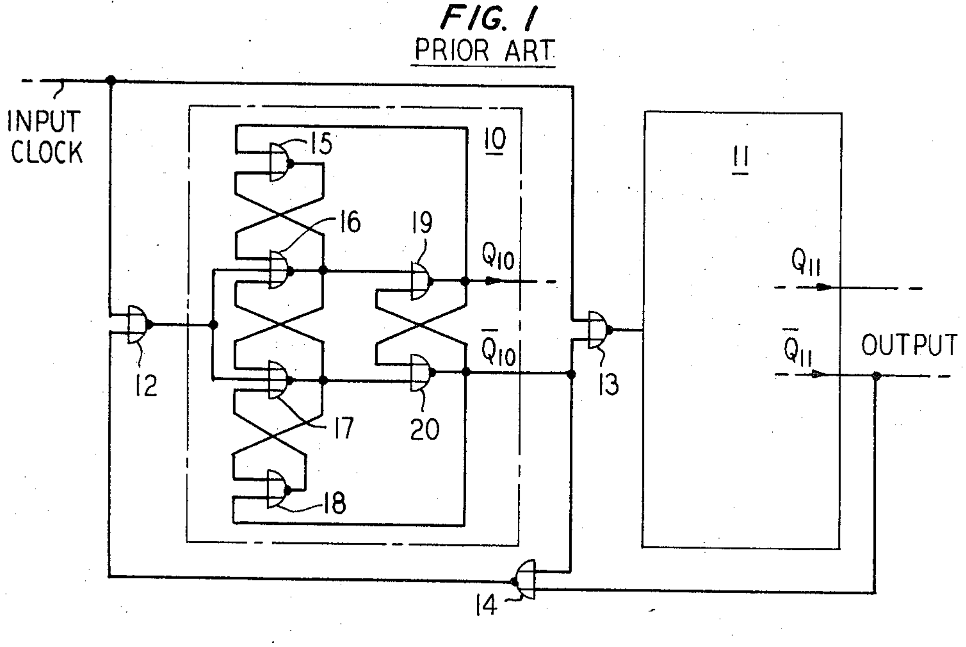
FIG. 1 PRIOR ART
FIG. 1 is a prior art divide by three circuit utilizing two toggle flip-flops and a feedback mechanism.

FIG. 1 illustrates a conventional divide by three logic network in a parallel-clocked counter configuration realized with NOR gates. Bistable elements 10 and 11 are identical toggle flip-flops which each provide a potential count of two or a total of four, but feedback is provided to inhibit the fourth unwanted state. Inputs to elements 10 and 11 are applied through driving gates 12 and 13 and feedback is provided from the outputs of gates 20 in elements 10 and 11 to driving gate 12 through feedback gate 14. In the configuration illustrated, element 11 is only allowed to toggle when element 10 (i.e., $Q_{10}$) is a logical 1. Element 10 is always allowed to toggle except when both elements 10 and 11 ($Q_{10}$ and $Q_{11}$ respectively) are at logical 1, and thus the fourth unwanted state is blocked so that the output pulse repetition frequency is one-third, rather than one-fourth of the input pulse repetition frequency.

Elements 10 and 11, fabricated from logic circuitry such as common toggle flip-flops as illustrated, each contain six gates 15 through 20 assembled in two groups. These gates may be of the high-speed integrated type such as the emitter coupled logic described in "Nanosecond Integrated Circuits" by J. A. Narud, Nerem Record, 1965, page 174.

The all-gate variations of elements 10 and 11, containing nothing other than the logic gates and the connecting leads, involve what will be referred to herein as "criss-cross" coupled gates, that is, gates in which the output of one provides an input of the other and vice versa. Examples of "criss-cross" gates are 15 and 16, 16 and 17, 17 and 18, and 19 and 20. This type of coupling results in a minimum of three time delays for the flip-flop to attain a stable state after a change of input state because at least three of the gates lie in each feedback path. Thus, even when using high-speed integrated logic gates having short propagation delays, a significant time delay is produced by the accumulated delays of the bistable elements and the additional delay produced by feedback gate 14.

Figure 2:
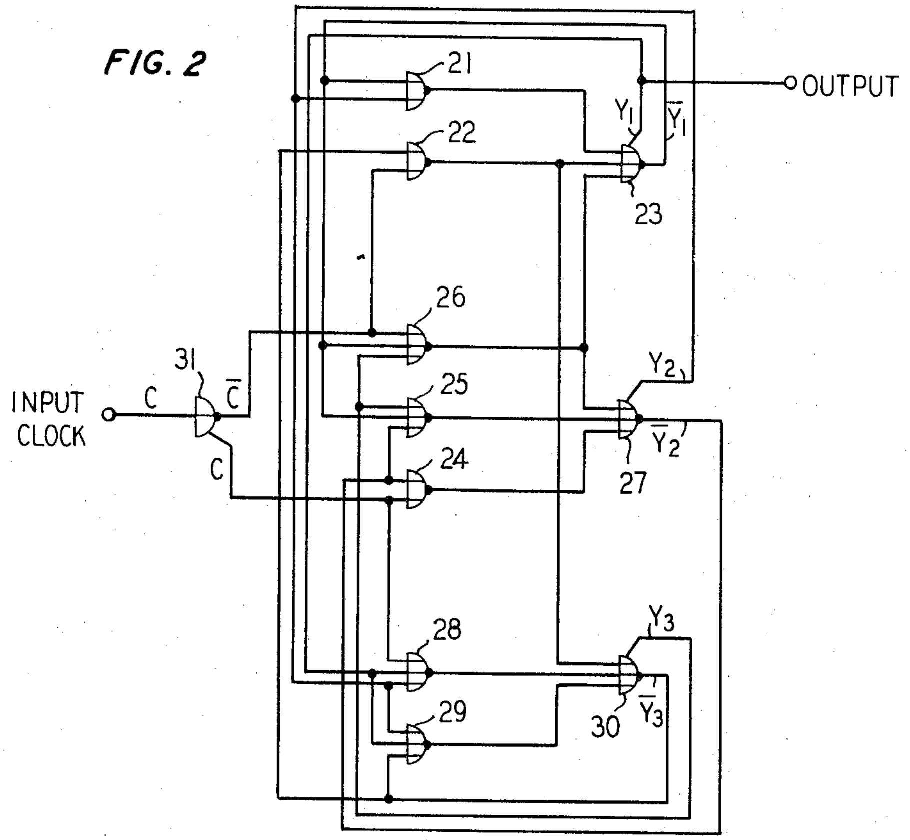
FIG. 2 is a divide by three logic circuit implemented with OR/NOR logic in accordance with the present invention.

FIG. 2 illustrates a direct divide by three logic circuit in accordance with the invention. In contrast to the logic circuitry of a bistable element, the configuration provides that the single stage divide by three circuit exhibits a total of two gate delays, and therefore the circuit achieves a stable state within two propagation delays after a change of input state.

The circuit described in FIG. 2 is an asynchronous sequential circuit which can be thought of as a logic configuration that maps an input sequence into an output sequence. It has an external input which is the clock C; it has internal feedback which accounts for the internal state variables; it has external outputs which are functions of the inputs and of the internal state variables; finally, it is asynchronous in that the delay in each feedback loop depends upon the propagation delay of each gate involved in that particular path.

Briefly, the logical function of such a network can be explained as follows. Six states are needed to provide the necessary memory for a divide-by-three circuit; that is, it takes three periods of the input clock C to get the sequential circuit back to the stable initial state. Since there are six states, three internal state variables designated $Y_1$, $Y_2$ and $Y_3$ and corresponding feedback inputs $y_1$, $y_2$ and $y_3$ can describe the logic pattern of the circuit.

Figures 3, 4A:
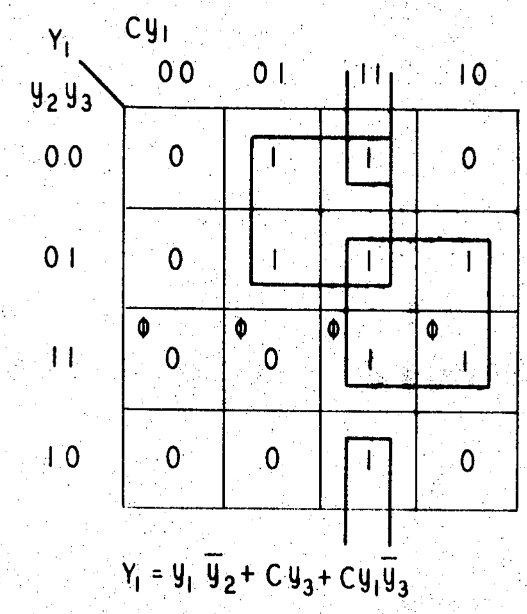
FIG. 3 is the excitation matrix including the special state assignments for the circuit of FIG. 2.
FIGS. 4A, 4B and 4C are the Karnaugh maps and expressions for each of the internal state variables in accordance with the circuit of FIG. 2.

The excitation matrix for the circuit appears in FIG. 3. Each of the states has been given a special binary designation and all stable states have been encircled. Stability is obviously provided when the feedback inputs $y_1$, $y_2$ and $y_3$ are identical to the internal state variables $Y_1$, $Y_2$ and $Y_3$ produced by the circuit. As is well known in the art the particular binary designation or state assignment is the essence or fingerprint of the circuit. The assignments are selected so as to allow only one state variable to change when the sequential circuit moves from one stable state to another, thus preventing any multivariable hazards and resulting in an economical realization.

Figure 4B:
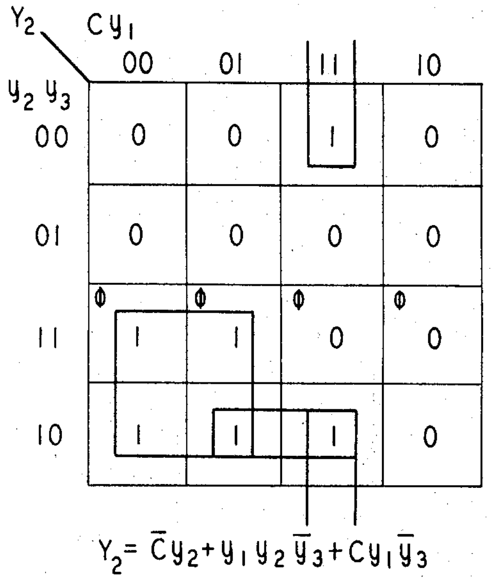
Figure 4C:
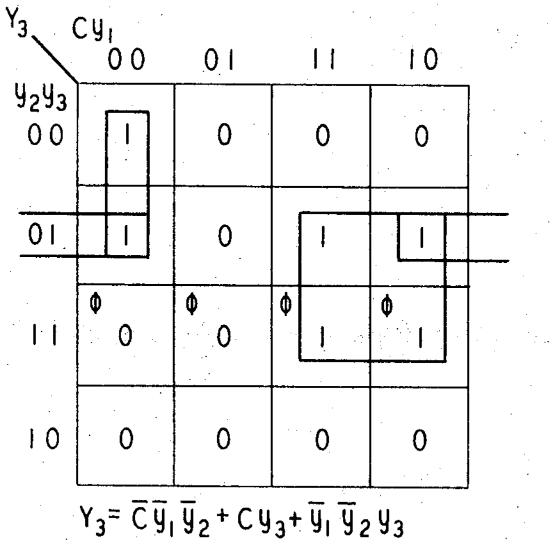

FIGS. 4A, 4B and 4C illustrate the Karnaugh maps and equations for the state variables $Y_1$, $Y_2$ and $Y_3$, respectively. The 36 known entries correspond to the values in the excitation matrix of FIG. 3. The 12 "don't care" entries, denoted by the symbol $\Phi$ do not exist in the matrix. The "don't care" choices are used to reduce the number of inputs required in the realization of the sequential circuit. The looping shown helps explain the corresponding logical expressions. A loop of four is sacrificed for a loop of two in FIG. 4A in order that the resulting term could also be used in the expression for $Y_2$. A term in the expression for $Y_1$ is also used in the expression for $Y_3$, thus resulting in the saving of another gate. The Karnaugh map illustrated in FIG. 4B contains a redundant loop in order to remove the static hazard that existed in that region. A static hazard is similarly removed from the Karnaugh map appearing in FIG. 4C. The removal of the static hazards by the addition of redundant loops increases the number of gates required, but is necessary to prevent unwanted behavior in the sequential circuit. The Karnaugh map of FIG. 4A contains a static hazard, since it is possible to move from one group of 1's by a single variable change without the transition also being enclosed in a loop. Although this situation represents a static hazard, it will never create a malfunction in the sequential circuit, since the transition will never occur except during a startup transient. The three expressions for the stable variables, which correspond to the loopings in FIGS. 4A—4C respectively are:

$$Y_1 = y_1\bar{y}_2 + Cy_3 + Cy_1\bar{y}_3 \quad (1)$$

$$Y_2 = \bar{C}y_2 + y_1y_2\bar{y}_3 + Cy_1\bar{y}_3 \quad (2)$$

$$Y_3 = \bar{C}\bar{y}_1\bar{y}_2 + Cy_3 + \bar{y}_1\bar{y}_2y_3 \quad (3)$$

These expressions are left in a sum of the products form in order to eliminate all dynamic hazards, since such hazards occur only in factored circuits. As is well known, these expressions represent the logical functions required to produce each internal state variable. For example, the logical AND combination of $y_1$ and $\bar{y}_2$ (the complement of $y_2$) is represented as $y_1\bar{y}_2$, and the logical OR combination of $y_1\bar{y}_2$ and $Cy_3$ is represented as $y_1\bar{y}_2 + Cy_3$. The use of these forms results in a two-level realization for each state variable. The particular assignment of "don't care" entries insures that no critical races occur and that the circuit will not lock up in some unwanted stable state. The configuration of FIG. 2 was realized directly from these expressions using NOR and OR/NOR gates by application of DeMorgan's theorem. Ten gates are used. Seven gates 21, 22, 24, 25, 26, 28 and 29 are NOR gates and the remaining three gates 23, 27 and 30 are OR/NOR gates. The OR output in all cases in the output emanating directly from the gate symbol and the NOR output is the output from the inverter (dot) at the end of the gate symbol. Any conventional gate may be appropriately employed, but identical integrated logic circuits of the type disclosed in the Narud article are preferred for high-speed operation. These gates have a propagation delay on the order of 1 to 2 nanoseconds and using them the circuit is capable of dividing by three an input clock having a pulse repetition frequency on the order of 100 MHz. to 200 MHz.

Integrated logic gates have inherent fan-out and fan-in limits. Obviously, if these limits are exceeded an additional series gate is needed in order to break up the load and this series gate will add an additional and undesirable delay. Further, it is preferred to maintain the fan-out below the gate's limit so that a utilization circuit may be driven by any gate. It is noted that all gates in the circuit of FIG. 2 utilize a maximum fan-in of three and a maximum fan-out of three and since available gates have fan-out limits of four or more, any gate output may be used to drive another device. This advantageous property is a result of the particular state assignments that were made.

The divide-by-three configuration contains two groups of gates. The primary NOR gates 21, 22, 24, 25, 26, 28 and 29 which can be seen from expressions (1)—(3) perform the logical AND functions, and the secondary OR/NOR gates 23, 27 and 30 which perform the logical OR function. The input clock is a pulse train in which its signal level, such as logical 1 begins on the transition from one level, such as from 0 to 1, ends on the transition back to the first level, such as from 1 to 0, and is periodic in nature. Since the circuit requires the time equivalent to two gate delays to settle before the input can change again, the duration of each level must exceed two gate delay times in order that the circuit function. The input clock C is applied to the inputs of gates 24 and 28 by driving gate 31 while the complementary input $\bar{C}$ is applied to the inputs of gates 22 and 26 by driving gate 31. No driving input is applied to the secondary OR/NOR gates. Distinctive of this invention the outputs of the primary gates are applied solely to the inputs of the secondary gates and thus these secondary gates are driven exclusively by the outputs of the primary gates. Since no primary gate outputs are inputs to other primary gates, none of the primary gates are "criss-cross" coupled, thus avoiding the undesirable delay present in the conventional bistable elements.

The output of the circuit may be taken at any of the secondary gate outputs. As illustrated the OR output of gate 23 is chosen, but each of the six outputs of gates 23, 27 or 30 will provide a distinctive pulse train. The duty cycle and/or the phase of the pulse trains relative to the input will be different for each of the six possible choices. This creates a versatility unavailable in many other dividers. The outputs of the secondary gates are each fed back to inputs of the primary gates, as illustrated, thus completing the configuration.

It is noted that in order to limit the circuit to two gate delays every feedback path from an output of a secondary gate contains only one primary and one secondary gate before reaching the output of the next secondary gate in that path. In other words each internal state variable is fed back through a single logical AND function (primary gate) and one logical OR function (secondary gate) to produce the succeeding value of an internal state variable.

Figure 5:
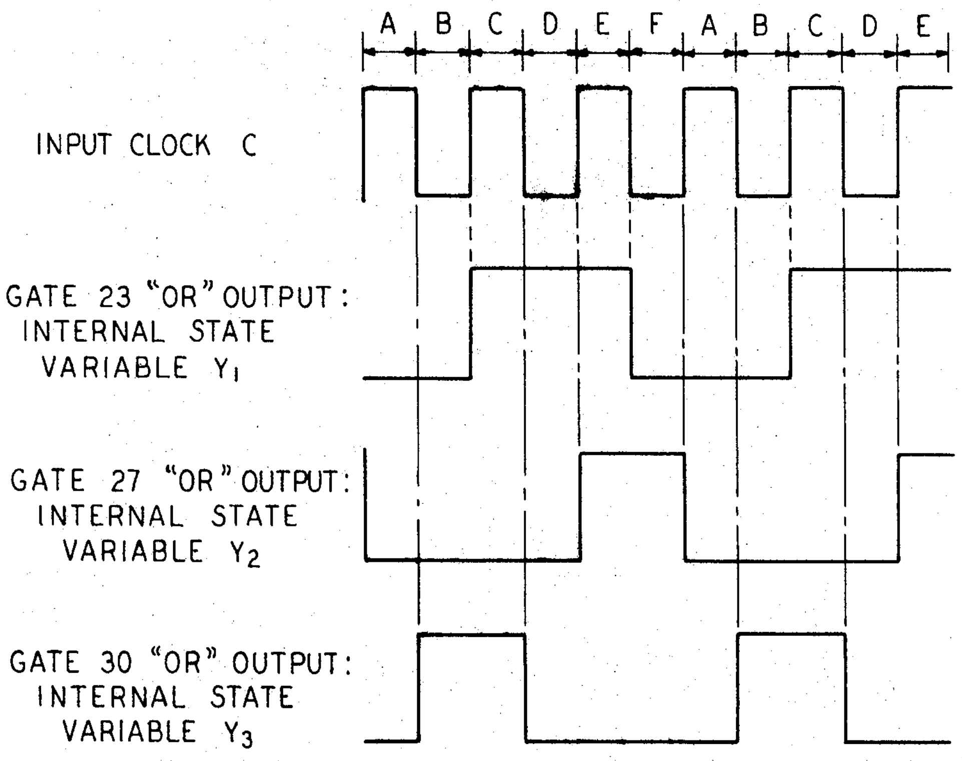
FIG. 5 is a timing diagram of selected signals in the circuit of FIG. 2.

It is illustrative to describe the operation of the invention with reference to the configuration of FIG. 2 and the corresponding timing diagram in FIG. 5. Assume initial conditions whereby the OR outputs of gates 23, 27 and 30 are at logical 0. The NOR outputs of gates 23, 27 and 30 are therefore at logical 1. Assume that the external input C is at logical 1.

By definition, any input of a NOR gate is at a logical 1 the output is at logical 0, and if all inputs of a NOR gate are at logical 0, the output is at logical 1; an OR output is the complement of the NOR output in all cases. The NOR output of gate 23 provides logical 1 inputs to gates 21, 26 and 25; therefore, the NOR outputs of these gates are at logical 0. The NOR output of gate 24 is also at logical 0 since one of its inputs is supplied by the NOR output of gate 27 which is at logical 1. The NOR outputs of gates 22 and 29 are at logical 0 since the NOR output of gate 30 provides each of these gates with a logical 1 input. The NOR output of gate 28 is at logical 0 since one of its inputs is the external input C which is at logical 1. The inputs to gates 23, 27 and 30 are obtained entirely from the NOR outputs of gates 21, 22, 24, 25, 26, 28 and 29; therefore, the NOR outputs of gates 23, 27 and 30 are at logical 1 since all of the inputs for each gate are at logical 0. The OR outputs of gates 23, 27 and 30 are at logical 0 which was initially assumed; therefore, the assumed initial conditions represent a stable situation. This stable situation is illustrated by region A of the timing diagram.

The circuit remains stable until the external input C goes to a logical 0. This provides a logical 0 input to gates 24 and 28. The NOR output of gate 24 remains at logical 0 since the other input is at logical 1. However, the NOR output of gate 28 changes from logical 0 to logical 1 since its other inputs from the OR outputs of gates 23 and 27 are also at logical 0. The NOR output of gate 28 thus provides a logical 1 input to gate 30. Previously, all three inputs to gate 30 were at logical 0; however, the logical 1 input now forces the OR (NOR) output to change to a logical 1 (0). The OR output of gate 30 provides a logical 1 input to gates 25 and 26. The NOR outputs of gates 25 and 26 remain at logical 0 since the other inputs also remained at logical 1. The NOR output of gate 30 provides a logical 0 input to gates 22 and 29. The NOR output of gate 22 remains at logical 0 since its C input is a logical 1. The NOR output of gate 29 changes to a logical 1 since all three of its inputs are at logical 0. The outputs of gate 30 do not change, when the NOR output of gate 29 changes to logical 1 since one of its other inputs (the NOR output of gate 28) was at logical 1. The counter has entered another stable state since no other changes can occur. The OR outputs of gates 23 and 27 are at logical 0 and the OR output of gate 30 is at logical 1. This situation is shown in region B of the timing diagram.

The circuit remains stable until the external input C goes to a logical 1. The change in C causes the NOR output of gate 28 to change to a logical 0. The outputs of gate 30 do not change since one of its other inputs is at logical 1. The change in C also causes the NOR output of gate 22 to change to a logical 1, which in turn causes the OR (NOR) output of gate 23 to change to a logical 1 (0). The change in the outputs of gate 23 cause the NOR output of gates 21 and 29 to change to a logical 1. The changes in the NOR outputs of gates 21 and 29 cause no further changes and the circuit remains stable with the OR outputs of gates 23 and 30 at logical 1 and the OR output of gate 27 at logical 0. This stable situation is represented by region C of the timing diagram.

The circuit remains stable until the external input C changes to a logical 0. This change causes the NOR output of gate 22 to change to logical 0. The NOR output of gate 22 causes the OR (NOR) output of gate 30 to change to a logical 0 (1). The change in the outputs of gate 30 causes no further changes in the outputs of any other gates and the circuit remains stable with the OR output of gate 23 at logical 1 and the OR outputs of gates 27 and 30 at logical 0. This stable situation is represented by region D of the timing diagram.

The circuit remains stable until the external input C changes to a logical 1. The change in the input C causes the NOR output of gate 26 to change to a logical 1. This change causes the OR (NOR) output of gate 27 to change to a logical 1 (0). The change in the outputs of gate 27 causes the NOR output of gate 21 to change to a logical 0 and the NOR output of gate 25 to change to a logical 1. There are no more changes and the OR outputs of gates 23 and 27 remain at logical 1 and the OR output of gate 30 remains at logical 0. This stable situation is represented by region E of the timing diagram.

The circuit remains stable until the external input C changes to a logical 0. This change causes the NOR output of gate 24 to change to a logical 1 and the NOR output of gate 26 to change to a logical 0. The change in the NOR output of gate 26 causes the OR (NOR) output of gate 23 to change to a logical 0 (1). This change in the outputs of gate 23 cause the NOR output of gate 25 to change to a logical 0. The change in the NOR output of gate 25 causes no further change and the circuit is in a stable condition. The OR output of gate 27 is at logical 1 and the OR outputs of gates 23 and 30 are at logical 0. This stable situation is represented by region F of the timing diagram.

The circuit remains stable until the external input C changes to a logical 1. This change causes the NOR output of gate 24 to change to a logical 0. The change in the NOR output of gate 24 causes the OR (NOR) output of gate 27 to change to a logical 0 (1). The conditions represented by the external input C being at a logical 1 and the OR outputs of gates 23, 27 and 30 being at logical 0 were shown to represent a stable situation when the initial conditions were assumed earlier. This stable situation is represented by region A of the timing diagram.

As can be noted with reference to the diagram in FIG. 5, one cycle of the circuit (i.e., times A through F) is three periods of the clock C. Each output or internal state variable has a period three times that of the input clock and a transition of one of them and only one occurs upon each transition of the clock. The outputs of gates 27 and 30 are effective (logical 1) during mutually exclusive halves of the cycle, and a transition of the output of gate 23 occurs upon the simultaneous occurrence of a transition of the clock and the existence of an effective output of either gate 27 or gate 30.

There are four combinations of the external input C and the OR outputs of gates 23, 27 and 30 that do not occur during normal operation, but they could exist as initial conditions when the power is first applied to the circuit. Each of the four combinations leads to one of the stable states shown on the timing diagram and thus enters the normal operating cycle.

The initial condition when the external input C and the OR output of gate 23 are at logical 0, and the OR outputs of gates 27 and 30 are at the logical 1 is an unstable situation. The circuit will, under these conditions, enter the stable state represented by the OR outputs of gates 23 and 30 being at logical 0 and the OR output of gate 27 being at logical 1. If the external input C has been a logical 1 instead of 0, the circuit would have gone to the stable state represented by the OR outputs of gates 23 and 30 being at logical 1 and the OR output of gate 27 being at the logical 0.

The initial condition when the external input C and the OR outputs of gates 23 and 27 and 30 are at logical 1 is also an unstable situation. The circuit will, under these conditions, enter the stable state represented by the OR outputs of gates 23 and 30 being at logical 1, and the OR output of gate 27 being at logical 0. If the external input C had been at logical 0 instead of 1, the circuit would have gone to the stable state represented by the OR outputs of gates 23 and 30 being at logical 0 and the OR output of gate 27 being at logical 1.

As can be seen in FIG. 2 the primary NOR gates can be grouped into three sets each set having a corresponding secondary OR/NOR gate. The inputs to the secondary gates come exclusively from the outputs of the primary gates in the corresponding set. One set of primary gates corresponding to secondary gate 23 is composed of gates 21, 22 and 26; a set formed by gates 24, 25 and 26 corresponds to secondary gate 27; and the last set contains gates 22, 28 and 29 and drives secondary gate 30. It is evident that gates 22 and 26 serve as parts of two sets and thus each drives two secondary gates. This economy reduces the number of gates otherwise required.

Figure 6:
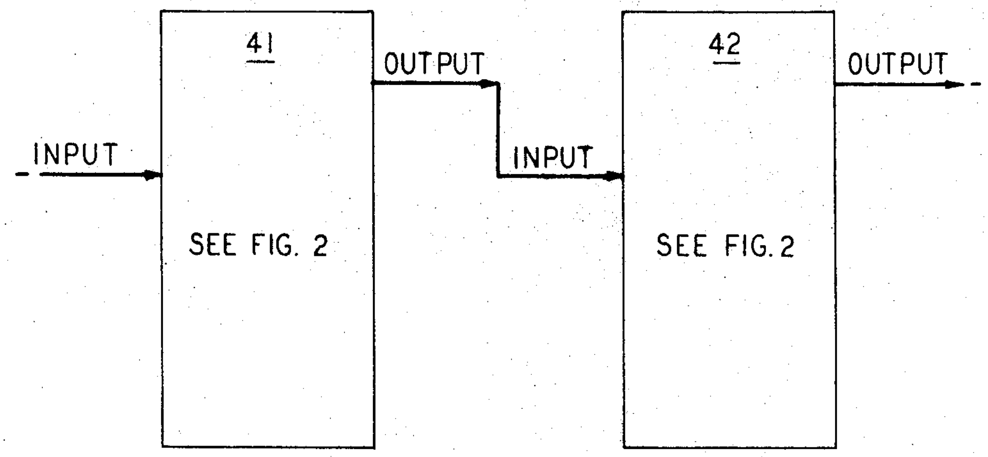
FIG. 6 is a divide by nine logic circuit in accordance with the present invention.

FIG. 6 represents an application of the divide by three configuration of FIG. 2. Series combinations of the divide-by-three circuit will enable division by integral powers of three or $3^P$. FIG. 6 illustrates a series of two divide-by-three circuits 41 and 42 identical to the circuits of FIG. 2; it thus provides division by nine. This circuit configuration if constructed with gates of the 2 nanoseconds propagation delay type is capable of frequency division by nine of an input pulse train having a frequency on the order of 100 MHz.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

I claim:

1. A divide-by-three logic circuit comprising:

input means for providing an input clock signal C;

three output logic gates providing outputs $Y_1$, $Y_2$ and $Y_3$, respectively;

a plurality of input gates having inputs $y_1$, $y_2$ and $y_3$ and said signal C;

connecting paths for interconnecting said input and output gates according to:

$$Y_1 = y_1\bar{y}_2 + Cy_3 + Cy_1\bar{y}_3$$
$$Y_2 = \bar{C}y_2 + y_1y_2\bar{y}_3 + Cy_1\bar{y}_3$$
$$Y_3 = \bar{C}\bar{y}_1\bar{y}_2 + Cy_3 + \bar{y}_1\bar{y}_2y_3;$$

feedback means connecting said outputs $Y_1$, $Y_2$ and $Y_3$ to said inputs $y_1$, $y_2$ and $y_3$; and output means for utilizing one of said outputs having a period three times the period of said input clock signal C.

2. A divide-by-three logic circuit comprising:

input means for providing a clock signal;

a plurality of output logic gates for producing a first, a second and a third internal state variable;

a first output logic gate for producing said first internal state variable by the logical OR combination of three signals produced respectively by logic gates interconnected to perform the AND combination of said first variable and the complement of said second variable, the logical AND combination of said clock signal and said third variable, and the logical AND combination of said clock signal and said first variable and the complement of said third variable;

a second output logic gate for producing said second internal state variable by the logical OR combination of three signals produced respectively by logic gates interconnected to perform the logical AND combination of the complement of said clock signal and said second variable, the logical AND combination of said first variable and said second variable and the complement of said third variable, and the logical AND combination of said clock signal and said first variable and the complement of said third variable;

a third output logic gate for producing said third internal state variable by the logical OR combination of three signals produced, respectively, by logic gates interconnected to perform the logical AND combination of the complement of said clock signal and the complement of said first variable, and the complement of said second variable, the logical AND combination of said clock signal and said third variable, and the logical AND combination of the complement of said first variable and the complement of said second variable, and said third variable; and output means for utilizing one of said internal state variables having a period three times the period of said input signal.

3. A divide-by-three logic circuit having a first, second and third internal state variable comprising:

input means for providing a clock signal;

a first primary logic gate for producing the AND combination of said first variable and the complement of said second variable;

a second primary logic gate for producing the AND combination of said clock signal and said third variable;

a third primary logic gate for producing the AND combination of the complement of said clock signal and said second variable;

a fourth primary logic gate for producing the AND combination of said first variable, said second variable, and the complement of said third variable;

a fifth primary logic gate for producing the AND combination of said clock signal, said first variable and the complement of said third variable;

a sixth primary logic gate for producing the AND combination of the complement of said clock signal, complement of said first variable, and the complement of said second variable;

a seventh primary logic gate for producing the AND combination of the complement of said first variable, the complement of said second variable, and said third variable;

a first second logic gate for producing said first state variable by the logical OR combination of said first, second and fifth primary logic gates;

a second secondary logic gate for producing said second state variable by the logical OR combination of said third, fourth and fifth primary logic gates;

a third secondary logic gate for producing said third state variable by the logical OR combination of said second, sixth and seventh primary logic gates; and output means for utilizing one of said internal state variables having a period three times the period of said input signal.

4. A high-speed divide-by-three circuit comprising a plurality of primary logic gates, said plurality of primary gates being grouped into three sets, three secondary logic gates one corresponding to each of said three sets of primary gates, coupling means connecting the outputs from said primary gates exclusively to the inputs of said secondary gates including means for connecting the output of each primary gate in each of said sets to an input of the corresponding one of said three secondary gates, feedback means connecting each output of each of said secondary gates to selected inputs of said primary gates, driving means connected exclusively to the remaining inputs of said primary gates for applying an initial pulse train having a given pulse repetition frequency, and output terminal means connected to one output of one of said secondary gates for monitoring an output pulse train of said given pulse repetition frequency divided by three.

5. A circuit as claimed in claim 4 wherein each set of primary gates contains three gates.

6. A circuit as claimed in claim 5 wherein said plurality of primary gates comprises seven gates and two of said primary gates are contained in two of said three sets each.

7. A circuit as claimed in claim 4 wherein each of said primary gates are identical integrated logic gates and wherein each of said secondary gates are identical integrated logic gates and each gate is driven by a maximum of three inputs and each gate drives a maximum of three other gates.

8. A divide by $3^P$ logic circuit, where P is an integer, comprising in series a combination of P circuits as claimed in claim 4.

9. A divide-by-nine logic circuit comprising in series a combination of two circuits as claimed in claim 4.